US012756295B2

(12) United States Patent
Liu et al.

(10) Patent No.: US 12,756,295 B2
(45) Date of Patent: Oct. 6, 2026

(54) PHASE-LOSS CONTROL METHOD FOR THREE-PHASE THREE-WIRE CONVERTER AND THREE-PHASE AC CONTROL SYSTEM

(71) Applicant: Lite-On Electronics (Guangzhou) Limited, Guangzhou City (CN)

(72) Inventors: Meng Liu, Guangzhou City (CN); HongLong Wang, Guangzhou City (CN); Bin Yun, Guangzhou City (CN); Ying Wang, Guangzhou City (CN)

(73) Assignee: Lite-On Electronics (Guangzhou) Limited, Guangzhou (CN)

( * ) Notice: Subject to any disclaimer, the term of this patent is extended or adjusted under 35 U.S.C. 154(b) by 186 days.

(21) Appl. No.: 18/945,395

(22) Filed: Nov. 12, 2024

(65) Prior Publication Data

US 2026/0058542 A1 Feb. 26, 2026

(30) Foreign Application Priority Data

Aug. 26, 2024 (CN) ......................... 202411181064.6

(51) Int. Cl.
*H02M 7/219* (2006.01)
*H02M 1/08* (2006.01)
*H02M 1/32* (2007.01)

(52) U.S. Cl.
CPC ............... *H02M 1/32* (2013.01); *H02M 1/08* (2013.01); *H02M 7/219* (2013.01)

(58) Field of Classification Search
CPC ........ H02M 3/073; H02M 3/10; H02M 3/135; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875;

(Continued)

(56) References Cited

U.S. PATENT DOCUMENTS

2006/0187683 A1* 8/2006 Hsieh ............... G01R 19/16547 363/10
2010/0080022 A1* 4/2010 Schmidt ................ H02M 7/062 363/53

(Continued)

FOREIGN PATENT DOCUMENTS

CN 112290784 A 1/2021

*Primary Examiner* — Crystal L Hammond
*Assistant Examiner* — Nusrat Quddus

(57) ABSTRACT

A phase-loss control method for a three-phase three-wire converter and a three-phase AC control system are disclosed. The processor executes this method by receiving a power signal, determining if the power signal has a phase loss, and determining whether the power signal had the phase loss at the previous moment. If there was no phase loss at the previous moment, it switches from a second operating state to a first operating state, outputting a first drive signal. If there was a phase loss at the previous moment, it switches from the first operating state to the second operating state, outputting a second drive signal. By detecting phase loss, the system can immediately switch between the first and second operating states based on whether phase loss is present or not, without causing the three-phase converter to shut down. This method allows seamless state switching, improving system stability.

16 Claims, 8 Drawing Sheets

(58) Field of Classification Search
CPC ........ H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 5/40; H02M 5/42; H02M 5/453; H02M 7/7575; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02M 3/1582; H02M 3/1584; H02M 3/285; H02M 3/33561; H02M 7/49; H02M 1/045; H02M 7/006; H02M 7/06; H02M 7/068; H02M 7/153; H02M 1/088; H02M 7/103; H02M 7/106; H02M 7/19; H02M 7/08; H02M 7/17; H02M 2001/007; H02M 7/493; H02M 7/5381; H02M 7/483; H02M 7/53873; H02M 1/084; H02M 1/0845; H02H 7/261; H02H 7/268; H02J 3/36; H02J 3/01; H02J 3/46; H02J 3/38

See application file for complete search history.

(56) References Cited

U.S. PATENT DOCUMENTS

| | | | | |
|---|---|---|---|---|
| 2014/0254217 | A1* | 9/2014 | Li | H02M 1/32<br>324/76.52 |
| 2016/0285381 | A1* | 9/2016 | Lai | G01R 31/42 |
| 2019/0165566 | A1* | 5/2019 | Stauffer | H02H 3/253 |
| 2020/0212822 | A1* | 7/2020 | Ogura | H02M 7/539 |
| 2020/0287539 | A1* | 9/2020 | Ma | H02P 29/0243 |
| 2022/0102975 | A1* | 3/2022 | Ishikawa | H02J 3/01 |
| 2024/0063725 | A1* | 2/2024 | Gokhale | G01R 31/55 |

* cited by examiner

PHASE-LOSS CONTROL METHOD FOR THREE-PHASE THREE-WIRE CONVERTER AND THREE-PHASE AC CONTROL SYSTEM

CROSS-REFERENCE TO RELATED APPLICATION

This application claims the priority benefit of Chinese Patent Application Serial Number 2024111810646, filed on Aug. 26, 2024, the full disclosure of which is incorporated herein by reference.

TECHNICAL FIELD

The present invention relates to a control method, and more particularly, to a control method for phase loss in a three-phase three-wire converter and a three-phase AC control system, applicable to most three-phase topologies (e.g., three-phase six-arm bridge rectifier circuits, Vienna rectifier circuits, T-Type rectifier circuits, ANPCs, etc.).

RELATED ART

In a three-phase converter, when a failure occurs in one of the phases, the three-phase converter must shut down for maintenance. As a result, whenever phase loss occurs in a three-phase converter, it will reduce the stability and reliability of the three-phase converter due to the shutdown.

Therefore, there is indeed a need for further improvements in the prior art.

SUMMARY

In view of the shortcomings of the prior art, the main objective of the present invention is to provide a control method and system for phase loss in a three-phase three-wire converter. By detecting phase loss, different drive signals can be output in response to different operating states, thus improving the stability and reliability of the three-phase converter.

The main technical solution to achieve the above objective is that the control method for phase loss in the three-phase three-wire converter is executed by a processor and includes the following steps:

- receiving a power supply signal;
- determining whether the power supply signal is experiencing a phase loss;
- if a phase loss is detected, determining whether the power supply signal experienced a phase loss at the previous time instance;
  - if no phase loss was detected in the previous time instance, switching from a second operating state to a first operating state and outputting a first drive signal;
- if no phase loss is detected, determining whether the power supply signal experienced a phase loss at the previous time instance;
  - if a phase loss was detected in the previous time instance, switching from the first operating state to the second operating state and outputting a second drive signal.

Preferably, in the step of "if no phase loss was detected in the previous time instance, switching from the second operating state to the first operating state and outputting a first drive signal," the method further includes the following sub-steps:

- if no phase loss was detected in the previous time instance, confirming the phase sequence of the phase loss in the power supply signal;
- after confirming the phase sequence of the phase loss in the power supply signal, switching from the second operating state to the first operating state and outputting the first drive signal.

Preferably, after the step of "if the phase loss is detected, determining whether the power supply signal experienced the phase loss at the previous time instance," the method further includes the following step:

- if a phase loss was detected in the previous time instance, maintaining the first operating state.

Preferably, after the step of "if no phase loss is detected, determining whether the power supply signal experienced a phase loss at the previous time instance," the method further includes the following step:

- If no phase loss was detected in the previous time instance, maintaining the second operating state.

Through the aforementioned method, by detecting phase loss using the control method for phase loss in a three-phase three-wire converter, the system can immediately switch to the phase loss operating state when phase loss occurs, thereby preventing the three-phase converter from shutting down. When no phase loss is detected, the system can switch to the normal operating state. Moreover, the design allows sharing certain parts between the phase loss operating state and the normal operating state, significantly reducing system complexity and improving the operational stability of the three-phase converter.

Another main technical solution to achieve the above objective is to provide a three-phase AC control system, which comprises:

- a three-phase converter configured to receive a power supply signal; and
- a processor having an input terminal and an output terminal, wherein the input terminal receives the power supply signal and the output terminal is electrically connected to the three-phase converter. The processor is configured to determine whether the power supply signal is experiencing a phase loss. If a phase loss is detected, the processor determines whether the power supply signal experienced a phase loss at a previous time instance. If a phase loss is detected and no phase loss was detected in the previous time instance, the processor switches from a second operating state to a first operating state and outputs a first drive signal. If no phase loss is detected, the processor determines whether the power supply signal experienced a phase loss at the previous time instance. If no phase loss is detected and a phase loss was detected in the previous time instance, the processor switches from the first operating state to the second operating state and outputs a second drive signal.

Preferably, the processor comprises:

- a voltage coordinate transformation and phase-locked circuit configured to receive the voltage of the power supply signal and generate a first stationary coordinate system voltage, a second stationary coordinate system voltage, and a phase angle based on the voltage of the power supply signal;
- a phase loss determination circuit configured to determine whether a phase loss has occurred based on the voltage of the power supply signal, to determine whether the system is in the first operating state or the second operating state, and to output a first coordinate rotational voltage potential, a second coordinate rotational voltage potential, and the phase angle;

a current coordinate transformation circuit configured to output a first coordinate rotational current and a second coordinate rotational current in response to the first or second operating state;

a voltage loop circuit configured to output a current control signal based on an error signal between a direct current voltage;

a current loop circuit configured to receive the first coordinate rotational voltage potential, the second coordinate rotational voltage potential, and the phase angle from the phase loss determination circuit, to receive the first coordinate rotational current and the second coordinate rotational current from the current coordinate transformation circuit, and to receive the current control signal from the voltage loop circuit, thereby generating the first stationary coordinate system voltage and the second stationary coordinate system voltage; a modulation wave generation circuit configured to perform modulation wave processing on the first stationary coordinate system voltage under the first operating state to output the first drive signal and to output the second drive signal based on the second operating state, the first stationary coordinate system voltage, and the second stationary coordinate system voltage.

Preferably, the voltage coordinate transformation and phase-locked circuit comprises a normal voltage coordinate transformation and phase-locked circuit and a phase loss voltage coordinate transformation and phase-locked circuit. The current coordinate transformation circuit comprises a normal current coordinate transformation circuit, a phase loss current coordinate transformation circuit, a first switching circuit, and a current rotational transformation circuit. The modulation wave generation circuit comprises a normal modulation wave generation circuit and a phase loss modulation wave generation circuit.

Preferably, the normal voltage coordinate transformation and phase-locked circuit comprises:

a voltage coordinate transformation circuit configured to receive the voltage of the power supply signal, perform coordinate transformation on the voltage of the power supply signal, and generate a first axis coordinate transformed voltage, a second axis coordinate transformed voltage, and a three-phase phase angle;

a rotational transformation and positive/negative sequence component circuit configured to perform rotational transformation on the first axis coordinate transformed voltage and second axis coordinate transformed voltage based on the three-phase phase angle, generating the first stationary coordinate system voltage and second stationary coordinate system voltage. The circuit also performs positive and negative sequence component processing on the first stationary coordinate system voltage and second stationary coordinate system voltage. Based on the first stationary coordinate system voltage, the circuit generates a first coordinate rotational positive sequence voltage and a first coordinate rotational negative sequence voltage. Based on the second stationary coordinate system voltage, the circuit generates a second coordinate rotational positive sequence voltage and a second coordinate rotational negative sequence voltage;

a three-phase phase-locked circuit configured to perform digital direct frequency synthesis and phase-locking on the first coordinate rotational positive and negative sequence voltages and on the second coordinate rotational positive and negative sequence voltages and to output a three-phase phase angle;

wherein the phase loss determination circuit determines whether the system is in the normal operating state based on the first coordinate rotational positive and negative sequence voltages and outputs the first coordinate rotational voltage potential, the second coordinate rotational voltage potential, and the three-phase phase angle.

Preferably, the phase loss voltage coordinate transformation and phase-locked circuit comprises:

a first voltage phase loss determination circuit configured to receive the voltage of the power supply signal and determine the phase sequence of a phase loss based on the line voltage of the power supply signal;

a voltage second-order generalized integrator circuit configured to filter the line voltage of the power supply signal corresponding to the phase sequence without phase loss, generating a first axis coordinate transformed single-phase voltage and a second axis coordinate transformed single-phase voltage;

a voltage rotational transformation circuit configured to perform rotational transformation on the first and second axis coordinate transformed single-phase voltages based on the single-phase phase angle, generating a first coordinate rotational single-phase voltage, a second coordinate rotational single-phase voltage, and the single-phase phase angle;

a phase-locked circuit configured to perform phase-locking on the first coordinate rotational single-phase voltage and on the second coordinate rotational single-phase voltage and to output the single-phase phase angle;

wherein the phase loss determination circuit determines the system is in the phase loss operating state based on the first coordinate rotational positive and negative sequence voltages and outputs the first and second coordinate rotational voltage potentials and the phase angle.

Preferably, the normal current coordinate transformation circuit comprises:

a current coordinate transformation circuit configured to receive the current of the power supply signal, perform coordinate transformation on the current of the power supply signal, and generate a first and second coordinate transformed current.

Preferably, the phase loss current coordinate transformation circuit comprises:

a second voltage phase loss determination circuit configured to receive the line voltage of the power supply signal and determine the phase sequence of the phase loss based on the line voltage of the power supply signal; and a current second-order generalized integrator circuit configured to filter the line current of the power supply signal corresponding to the phase sequence without phase loss, generating a first and second coordinate transformed single-phase current.

Preferably, the first switching circuit and second switching circuit are configured to receive the first coordinate rotational positive sequence voltage and the first coordinate rotational negative sequence voltage, respectively, and switch to the phase loss operating state or normal operating state. The current rotational transformation circuit is configured to perform rotational transformation on the first and second coordinate transformed currents based on the phase angle, generating the first and second coordinate rotational currents. Alternatively, the current rotational transformation circuit is configured to perform rotational transformation on the first and second coordinate transformed single-phase currents based on the phase angle, generating the first coordinate rotational current and second coordinate rotational current.

Preferably, the normal modulation wave generation circuit comprises:

a normal inverse coordinate transformation circuit configured to receive the first stationary coordinate system voltage and the second stationary coordinate system voltage and perform inverse coordinate transformation on the first stationary coordinate system voltage and the second stationary coordinate system voltage, generating a first coordinate inverse transformation voltage, a second coordinate inverse transformation voltage, and a third coordinate inverse transformation voltage.

Preferably, the phase loss modulation wave generation circuit comprises:

an inverse coordinate transformation circuit under phase loss conditions, configured to receive the first stationary coordinate system voltage and perform inverse coordinate transformation on the first stationary coordinate system voltage, generating a first, second, and third coordinate inverse transformation phase loss voltage;

a third voltage phase loss determination circuit configured to determine the phase sequence of a phase loss based on the line voltage of the power supply signal and to output a zero value for the first coordinate inverse transformation phase loss voltage, the second coordinate inverse transformation phase loss voltage, or the third coordinate inverse transformation phase loss voltage corresponding to the phase sequence with phase loss when the phase angle difference between two of the first coordinate inverse transformation phase loss voltage, the second coordinate inverse transformation phase loss voltage, or the third coordinate inverse transformation phase loss voltage corresponding phase sequences without phase loss is 180 degrees.

Preferably, the voltage loop circuit is configured to receive the actual DC voltage and the desired DC voltage, calculate the error signal between the actual and desired DC voltages, and input the error signal into a proportional-integral circuit to generate the current control signal, which is transmitted to the current loop circuit.

Preferably, the current loop circuit, upon receiving the current control signal, calculates a first error signal between the current control signal and the first coordinate rotational current and calculates a second error signal between the second coordinate rotational current and a constant value. The first error signal and second error signal are transmitted to the proportional-integral circuit to generate a first error voltage and a second error voltage. After receiving the first coordinate rotational current and second coordinate rotational current, the current loop circuit transmits the first coordinate rotational current and the second coordinate rotational current to a decoupling circuit to perform decoupling processing so as to generate a first decoupling voltage on the first axis and a second decoupling voltage on the second axis. Based on the second decoupling voltage, the first coordinate rotational voltage potential, and the first error voltage, the current loop circuit calculates a first rotational error voltage, and based on the phase angle, adds the first rotational error voltage to the actual DC voltage in inverse rotational transformation to generate the first stationary coordinate system voltage. Similarly, based on the first decoupling voltage, the second coordinate rotational voltage potential, and the second error voltage, the current loop circuit calculates a second rotational error voltage, and based on the phase angle, adds the second rotational error voltage to the actual DC voltage in inverse rotational transformation to generate the second stationary coordinate system voltage.

Through the above configuration, phase loss detection in the three-phase AC control system allows immediate switching to the phase loss operating state without causing the three-phase converter to shut down. When no phase loss is detected, the system can switch to the normal operating state. Additionally, the shared design of the phase loss and normal operating states reduces system complexity and significantly improves the operational stability of the three-phase converter.

BRIEF DESCRIPTION OF THE DRAWINGS

The accompanying drawings presented herein serve to deepen the understanding of the present invention and are an integral part thereof. The illustrative embodiments and their explanations are provided to elucidate the present invention and do not impose any undue limitations on it. In the drawings.

DETAILED DESCRIPTION OF THE EMBODIMENTS

Below, in conjunction with the drawings of the embodiments of the present invention, the technical solutions of the embodiments will be clearly and completely described. It is evident that the described embodiments are some of the embodiments of the present invention, not all of them. Based on the disclosed embodiments, any other embodiments obtained by those skilled in the art without creative efforts shall fall within the scope of protection of the present invention.

Figure 1:
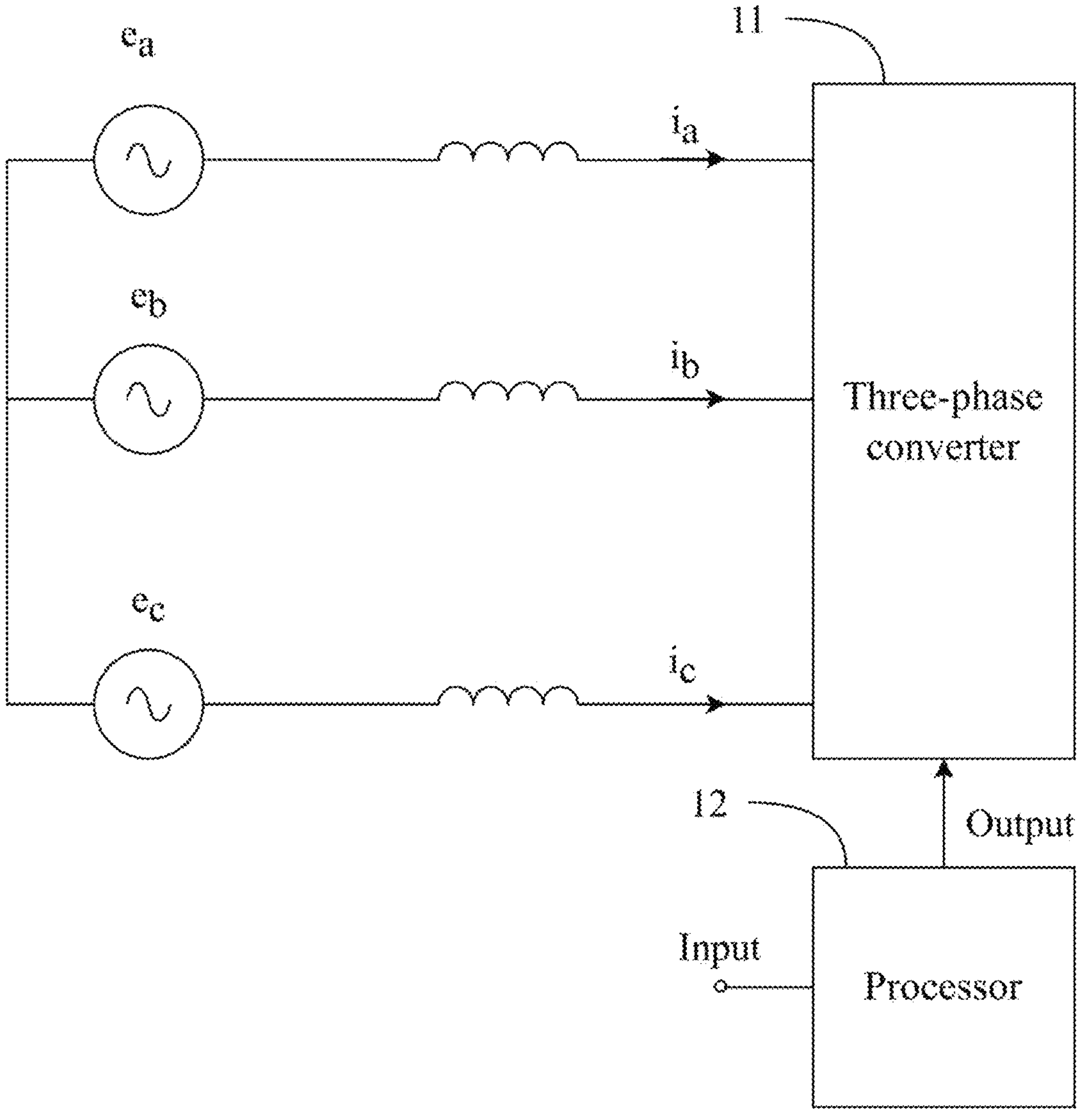
FIG. 1 is a block diagram of the three-phase AC control system of the present invention.

FIG. 1 shows an embodiment of the three-phase AC control system of the present invention. As shown in FIG. 1, the three-phase AC control system includes a three-phase converter 11 and a processor 12. The three-phase converter 11 is electrically connected to the three-phase power sources $e_a$, $e_b$, $e_c$. The processor 12 includes an input terminal Input and an output terminal Output. The input terminal Input receives the three-phase power sources $e_a$, $e_b$, $e_c$, which include three-phase voltage and/or three-phase current. The output terminal Output is electrically connected to the three-phase converter 11. The processor 12 determines the voltage statuses of the three-phase power sources $e_a$, $e_b$, $e_c$ at the current moment and the previous moment. If the voltage statuses are the same, the three-phase converter 11 maintains its current operating state. If the voltage statuses are different, the processor switches the operating state of the three-phase converter 11 and outputs a drive signal, which is transmitted to the three-phase converter 11 through the output terminal Output. In this embodiment, the operating states include a normal operating state and a phase loss operating state.

Specifically, the processor 12 determines whether there is a phase loss based on the voltage of the three-phase power sources $e_a$, $e_b$, $e_c$. If a phase loss is detected at the current moment, the processor further determines whether there was a phase loss at the previous moment. If a phase loss is detected at the current moment but not at the previous moment, the system switches from the second operating state to the first operating state and outputs a first drive signal. If no phase loss is detected at the current moment, the processor further determines whether there was a phase loss at the previous moment. If no phase loss is detected at the current moment, but there was a phase loss at the previous moment, the system switches from the first operating state to the second operating state and outputs a second drive signal. In this embodiment, the first operating state is the phase loss operating state, and the second operating state is the normal operating state.

Figure 2:
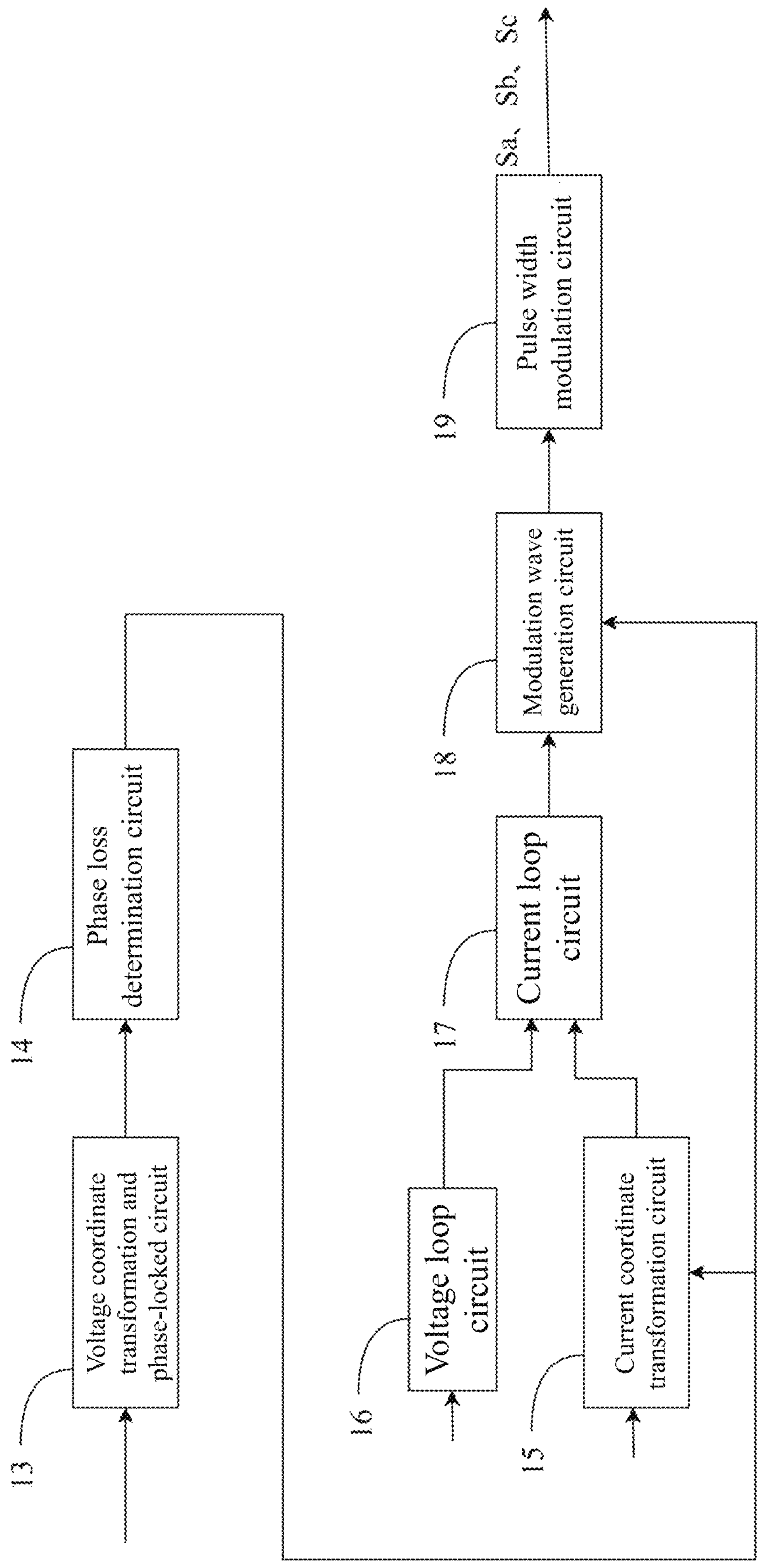
FIG. 2 is a block diagram of the processor of the present invention.

FIG. 2 is a block diagram of one embodiment of the processor of the present invention. As shown in FIG. 2, the processor 12 includes a voltage coordinate transformation and phase-locked circuit 13, a phase loss determination circuit 14, a current coordinate transformation circuit 15, a voltage loop circuit 16, a current loop circuit 17, a modulation wave generation circuit 18, and a pulse width modulation circuit 19. First, the voltage coordinate transformation and phase-locked circuit 13 receives the three-phase power sources $e_a$, $e_b$, $e_c$. The phase loss determination circuit 14 determines whether a phase loss exists based on the three-phase power sources $e_a$, $e_b$, $e_c$. If a phase loss is detected, the system generates a first control signal; otherwise, a second control signal is generated. After the first or second control signal is generated, it is transmitted to the current coordinate transformation circuit 15 and the modulation wave generation circuit 18. The current coordinate transformation circuit 15 and the modulation wave generation circuit 18 respond to the first control signal or second control signal by executing the corresponding first operating state or second operating state. Through the voltage loop circuit 16 and the current loop circuit 17, input signals are provided to the modulation wave generation circuit 18 so that the pulse width modulation circuit 19 will output a drive signal that drives the three-phase converter 11 to switch operating states. As a result, the three-phase converter 11 will not be restricted by phase loss and will not experience a shutdown. Detailed explanations of each circuit in both the normal operating state and the phase loss operating state are provided in the following sections.

In one embodiment, the voltage coordinate transformation and phase-locked circuit 13 includes a normal voltage coordinate transformation and phase-locked circuit 131 and a phase loss voltage coordinate transformation and phase-locked circuit 132. The current coordinate transformation circuit 15 includes a normal current coordinate transformation circuit 151, a phase loss current coordinate transformation circuit 152, a first switching circuit 153, and a current rotational transformation circuit 154. The current loop circuit 17 includes an inverse rotational transformation circuit 171. The modulation wave generation circuit 18 includes a normal modulation wave generation circuit 181, a phase loss modulation wave generation circuit 182, and a second switching circuit 183.

The detailed description of the normal operating state is as follows.

Figure 3:
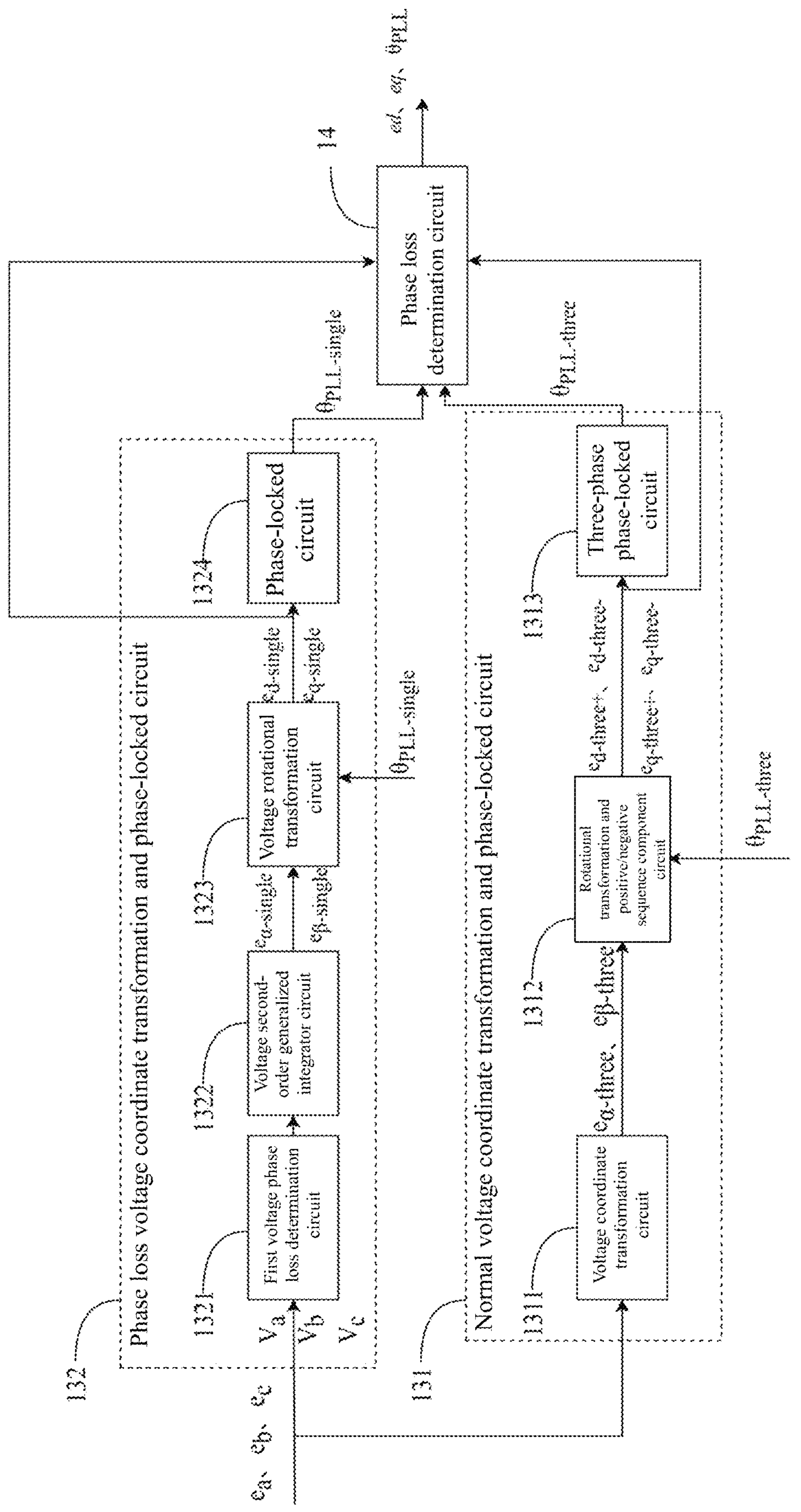
FIG. 3 is a block diagram of the voltage coordinate transformation and phase-locked circuit and the phase loss determination circuit of the present invention.

FIG. 3 is a block diagram of the voltage coordinate transformation and phase-locked circuit and the phase loss determination circuit of the present invention in the normal operating state. As shown in FIG. 3, the normal voltage coordinate transformation and phase-locked circuit 131 includes a voltage coordinate transformation circuit 1311, a rotational transformation and positive/negative sequence component circuit 1312, and a three-phase phase-locked circuit 1313. After receiving the three-phase power sources $e_a$, $e_b$, $e_c$, the voltage coordinate transformation circuit 1311 performs coordinate transformation on the line voltages $V_a$, $V_b$, $V_c$ of the three-phase power sources $e_a$, $e_b$, $e_c$ to convert the line voltages $V_a$, $V_b$, $V_c$ of the three-phase power sources into two coordinate axes so as to generate a first axis coordinate transformed voltage eα-three, a second axis coordinate transformed voltage $e_{\beta\text{-}three}$, and a three-phase phase angle $\theta_{PLL\text{-}three}$. Then the rotational transformation and positive/negative sequence component circuit 1312 performs rotational transformation on the first axis coordinate transformed voltage $e_{\alpha\text{-}three}$ and the second axis coordinate transformed voltage ep-three based on the three-phase phase angle $\theta_{PLL\text{-}three}$, generating a first stationary coordinate system voltage $e_{d\text{-}three}$ and a second stationary coordinate system voltage $e_{q\text{-}three}$. The rotational transformation and positive/negative sequence component circuit 1312 then performs positive and negative sequence component processing on the first stationary coordinate system voltages $e_{d\text{-}three}$ and the second stationary coordinate system voltage $e_{q\text{-}three}$, generating a first coordinate rotational positive sequence voltage $e_{d\text{-}three+}$ and a first coordinate rotational negative sequence voltage $e_{d\text{-}three-}$ from the first stationary coordinate system voltage $e_{d\text{-}three}$, and generating a second coordinate rotational positive sequence voltage $e_{q\text{-}three+}$ and a second coordinate rotational negative sequence voltage $e_{q\text{-}three-}$ from the second stationary coordinate system voltage $e_{q\text{-}three}$. The three-phase phase-locked circuit 1313 performs digital direct frequency synthesis and phase-locked processing (DDSRF-PLL) on the first coordinate rotational positive sequence voltage $e_{d\text{-}three+}$, the first coordinate rotational negative sequence voltage $e_{d\text{-}three-}$, the second coordinate rotational positive sequence voltage $e_{q\text{-}three+}$, and the second coordinate rotational negative sequence voltage $e_{q\text{-}three-}$, outputting the three-phase phase angle $\theta_{PLL\text{-}three}$. The phase loss determination circuit 14 then determines that the operating state is the normal operating state based on the first coordinate rotational positive sequence voltage $e_{d\text{-}three+}$ and the first coordinate rotational negative sequence voltage $e_{d\text{-}three-}$, and outputs a first coordinate rotational voltage potential ed, a second coordinate rotational voltage potential eq, and a phase angle $\theta_{PLL}$.

Figure 4:
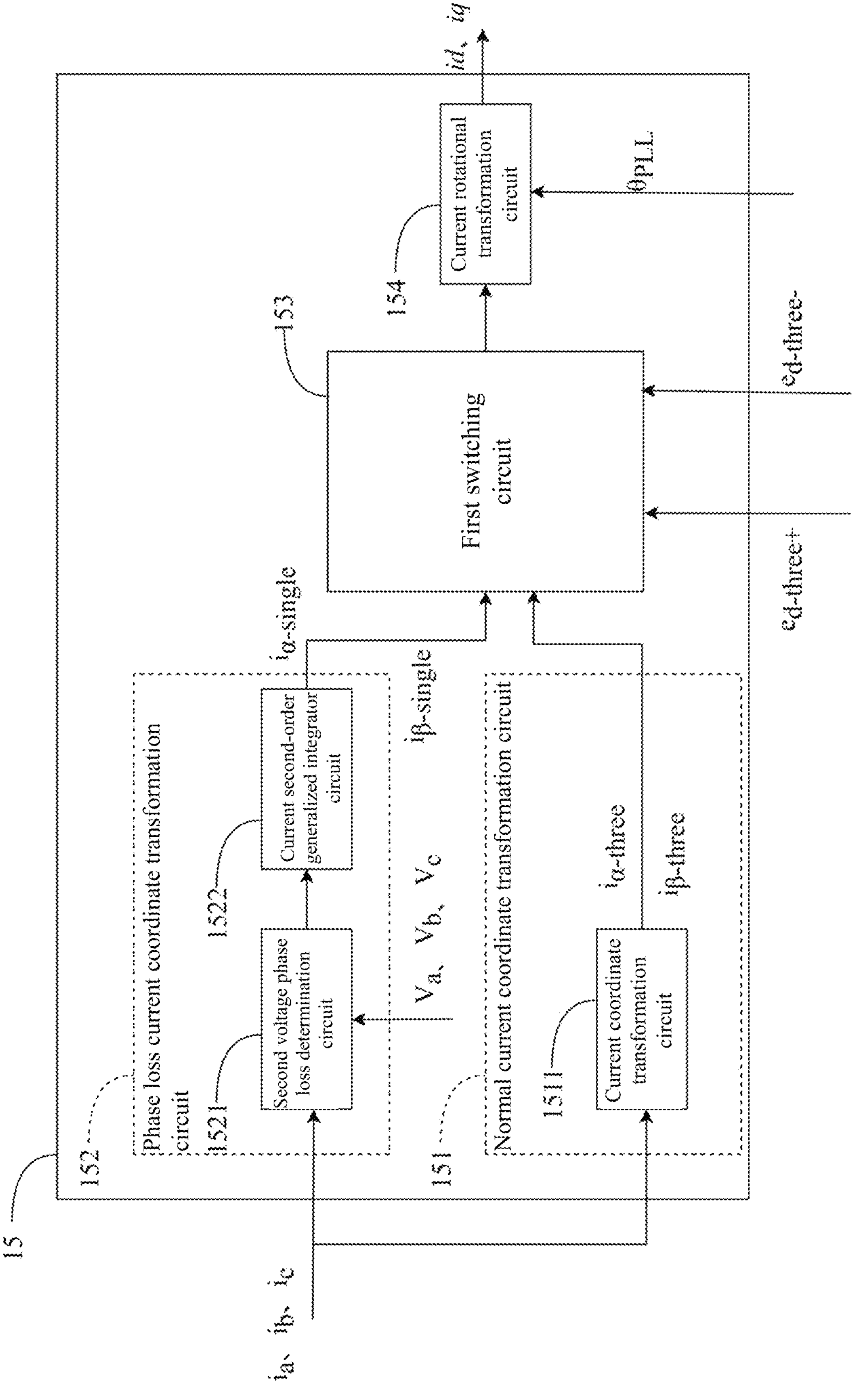
FIG. 4 is a block diagram of the current coordinate transformation circuit of the present invention.

FIG. 4 is a block diagram of an embodiment of the current coordinate transformation circuit of the present invention. As shown in FIG. 4, the normal current coordinate transformation circuit 151 includes a current coordinate transformation circuit 1511. When the phase loss determination circuit 14 determines that the system is in the normal operating state, the first switching circuit 153 receives the first coordinate rotational positive sequence voltage $e_{d\text{-}three+}$ and the first coordinate rotational negative sequence voltage $e_{d\text{-}three-}$ and switches to the normal operating state based on the first coordinate rotational positive sequence voltage $e_{d\text{-}three+}$ and the first coordinate rotational negative sequence voltage $e_{d\text{-}three-}$. Once the first switching circuit 153 has switched to the normal operating state, the current coordinate transformation circuit 1511 receives the three-phase power sources $e_a$, $e_b$, $e_c$ and performs coordinate transformation on the line currents $i_a$, $i_b$, $i_c$ of the three-phase power sources $e_a$, $e_b$, $e_c$, converting the line currents $i_a$, $i_b$, $i_c$ of the three-phase power sources $e_a$, $e_b$, $e_c$ into the first coordinate transformed current $i_{\alpha\text{-}three}$ and the second coordinate transformed current $i_{\beta\text{-}three}$. The current rotational transformation circuit 154 then performs rotational transformation on the first coordinate transformed current $i_{\alpha\text{-}three}$ and the second coordinate transformed current $i_{\beta\text{-}three}$ based on the phase angle $\theta_{PLL}$, converting the first coordinate transformed current $i_{\alpha\text{-}three}$ and the second coordinate transformed current $i_{\beta\text{-}three}$ into the first coordinate rotational current id and the second coordinate rotational current iq.

Figure 5:
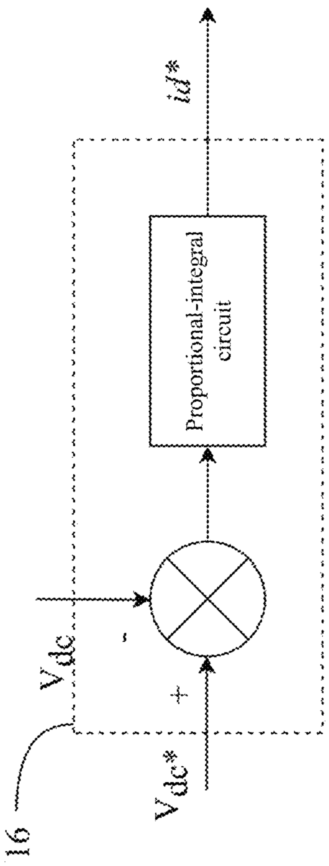
FIG. 5 is a block diagram of the voltage loop circuit of the present invention.

FIG. 5 is a block diagram of the voltage loop circuit. As shown in FIG. 5, the voltage loop circuit 16 is configured to receive the actual DC voltage $V_{dc}$ and the desired DC voltage $V_{dc}$* and to calculate the error signal between the actual DC voltage $V_{dc}$ and the desired DC voltage $V_{dc}$*. The error signal is then input into the proportional-integral (PI) circuit PI and generates a current control signal id*, which is transmitted to the current loop circuit 17.

Figure 6:
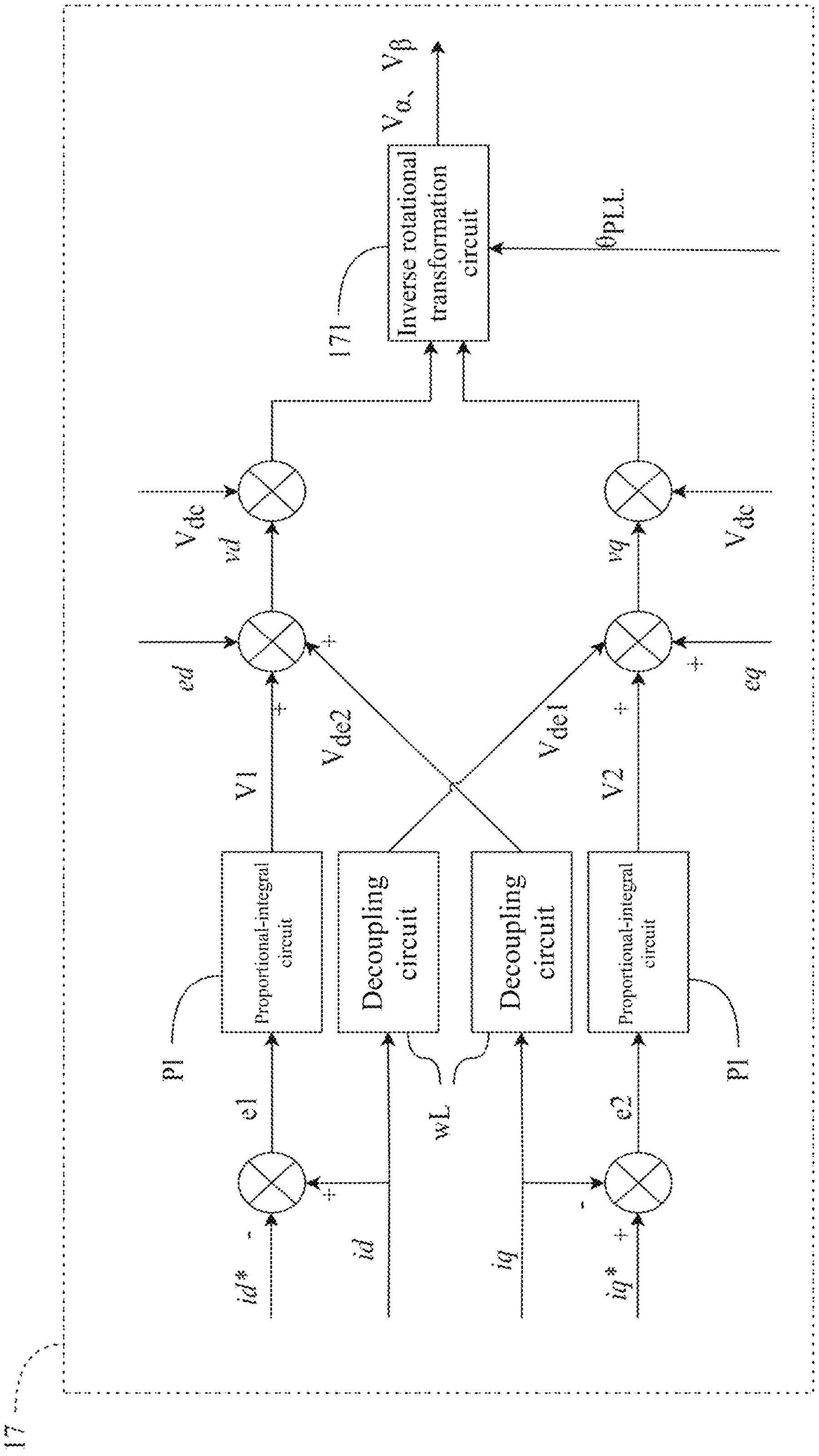
FIG. 6 is a block diagram of the current loop circuit of the present invention.

FIG. 6 is a block diagram of the current loop circuit. As shown in FIG. 6, when the current loop circuit 17 receives the current control signal id*, it calculates a first error signal e1 based on the current control signal id* and the first coordinate rotational current id. Additionally, it calculates a second error signal e2 based on the second coordinate rotational current iq and a constant value iq*, where the constant value iq* is zero in this embodiment. The first error signal e1 and the second error signal e2 are then transmitted to the proportional-integral circuit PI, generating a first error voltage V1 and a second error voltage V2. After receiving the first coordinate rotational current id and the second coordinate rotational current iq, the current loop circuit 17 transmits the first coordinate rotational current id and the second coordinate rotational current iq to the decoupling circuit wL for decoupling, generating a first decoupling voltage $V_{de1}$ on the first axis and a second decoupling voltage $V_{de2}$ on the second axis. Specifically, the decoupling process transmits the first coordinate rotational current id and the second coordinate rotational current iq to the decoupling circuit wL, where the angular frequency and inductor in the decoupling circuit wL generate the first decoupling voltage $V_{de1}$ on the first axis and the second decoupling voltage $V_{de2}$ on the second axis. The current loop circuit 17 then calculates the first rotational error voltage vd based on the second decoupling voltage $V_{de2}$, the first coordinate rotational voltage potential ed, and the first error voltage V1. It also calculates the second rotational error voltage vq based on the second decoupling voltage $V_{de2}$, the second coordinate rotational voltage potential eq, and the second error voltage V2. Specifically, the first rotational error voltage vd and the second rotational error voltage vq are calculated using the following equations (1) and (2).

$$vd = -PI \times (id* - id) + ed + wL \times iq \quad \text{Equation (1)}$$

$$vq = -PI \times (iq* - iq) + eq + wL \times id \quad \text{Equation (2)}$$

In equations (1) and (2), PI refers to the processing through the proportional-integral circuit PI; w refers to the angular frequency; L refers to the inductor; id* refers to the current control signal; id refers to the first coordinate rotational current; ed refers to the first coordinate rotational voltage potential; iq* refers to the constant value; iq refers to the second coordinate rotational current; eq refers to the second coordinate rotational voltage potential.

Next, the first rotational error voltage vd and the second rotational error voltage vq are added to the actual DC voltage $V_{dc}$. The inverse rotational transformation circuit 171 of the current loop circuit 17 then performs inverse rotational transformation on the summed first rotational error voltage vd and second rotational error voltage vq based on the phase angle $\theta_{PLL}$, thereby generating the first stationary coordinate system voltage $V_\alpha$ and the second stationary coordinate system voltage $V_\beta$.

Next, in the normal operating state, the pulse width modulation circuit 19 outputs drive signals Sa, Sb, Sc based on the first coordinate inverse transformation voltage $V_{a\text{-}three}$, the second coordinate inverse transformation voltage $V_{b\text{-}three}$, and the third coordinate inverse transformation voltage $V_{c\text{-}three}$.

The detailed description of the phase loss operating state is as follows.

In the phase loss operating state, as shown in FIG. 3, the first voltage phase loss determination circuit 1321 receives the three-phase power sources $e_a$, $e_b$, $e_c$. The first voltage phase loss determination circuit 1321 determines the phase sequence of the phase loss in the three-phase power sources $e_a$, $e_b$, $e_c$ based on the line voltages $V_a$, $V_b$, $V_c$. After the first voltage phase loss determination circuit 1321 determines the phase sequence of the phase loss in the line voltages $V_a$, $V_b$, $V_c$, the corresponding line voltages $V_a$, $V_b$, $V_c$ for the phase sequence without phase loss are filtered through the voltage second-order generalized integrator circuit 1322, generating the first axis coordinate transformed single-phase voltage $e_{\alpha\text{-}single}$ and the second axis coordinate transformed single-phase voltage $e_{\beta\text{-}single}$. The first axis coordinate transformed single-phase voltage $e_{\alpha\text{-}single}$, the second axis coordinate transformed single-phase voltage $e_{\beta\text{-}single}$, and the single-phase phase angle $\theta_{PLL\text{-}single}$ are then transmitted to the voltage rotational transformation circuit 1323, where the first axis coordinate transformed single-phase voltage $e_{\alpha\text{-}single}$ and the second axis coordinate transformed single-phase voltage $e_{\beta\text{-}single}$ undergo rotational transformation to generate the first coordinate rotational single-phase voltage $e_{d\text{-}single}$ and the second coordinate rotational single-phase voltage $e_{q\text{-}single}$. The first coordinate rotational single-phase voltage $e_{d\text{-}single}$ and the second coordinate rotational single-phase voltage $e_{q\text{-}single}$ are transmitted to the phase-locked circuit 1324 for phase-locked processing, outputting the single-phase phase angle $\theta_{PLL\text{-}single}$. The phase loss determination circuit 14 determines that the system is in the phase loss operating state based on the first coordinate rotational positive sequence voltage $e_{d\text{-}three+}$ and the first coordinate rotational negative sequence voltage $e_{d\text{-}three-}$, and outputs the first coordinate rotational voltage potential ed, the second coordinate rotational voltage potential eq, and the phase angle $\theta_{PLL}$. In this embodiment, the filtering process uses a second-order generalized integrator (SOGI) to process the line voltage corresponding to the phase sequence without phase loss, generating the first axis coordinate transformed single-phase voltage $e_{\alpha\text{-}single}$ and the second axis coordinate transformed single-phase voltage $e_{\beta\text{-}single}$.

As shown in FIG. 4, when the phase loss determination circuit 14 determines that the system is in the phase loss operating state, the first switching circuit 153 receives the first coordinate rotational positive sequence voltage $e_{d\text{-}three+}$ and the first coordinate rotational negative sequence voltage $e_{d\text{-}three-}$ and switches to the phase loss operating state based on the first coordinate rotational positive sequence voltage $e_{d\text{-}three+}$ and the first coordinate rotational negative sequence voltage $e_{d\text{-}three-}$. In the phase loss operating state, the second voltage phase loss determination circuit 1521 receives the three-phase power source $e_a$, $e_b$, $e_c$ and determines the phase sequence of the phase loss based on the line voltages $V_a$, $V_b$, $V_c$ of the three-phase power sources $e_a$, $e_b$, $e_c$. After determining the phase sequence of the phase loss, the second voltage phase loss determination circuit 1521 filters the line currents $i_a$, $i_b$, $i_c$ corresponding to the non-phase-loss sequence through the current second-order generalized integrator circuit 1522, generating the first coordinate transformed single-phase current $i_{\alpha\text{-}single}$ and the second coordinate transformed single-phase current $i_{\beta\text{-}single}$. Then the current rotational transformation circuit 154 performs rotational transformation on the first coordinate transformed single-phase current iα-single and the second coordinate transformed single-phase current $i_{\beta\text{-}single}$ based on the phase angle $\theta_{PLL}$, converting the first coordinate transformed single-phase current $i_{\alpha\text{-}single}$ and the second coordinate transformed single-phase current $i_{\beta\text{-}single}$ into the first coordinate rotational current id and the second coordinate rotational current iq. In this embodiment, the filtering process uses the second-order generalized integrator (SOGI) to process the line current corresponding to the non-phase-loss sequence, generating the first coordinate transformed single-phase current $i_{\alpha\text{-}single}$ and the second coordinate transformed single-phase current $i_{\beta\text{-}single}$.

As shown in FIGS. 5 and 6, the signal transmission of the voltage loop circuit 16 and the current loop circuit 17 in the phase loss operating state is the same as that in the normal operating state; hence, it is not repeated here.

Figure 7:
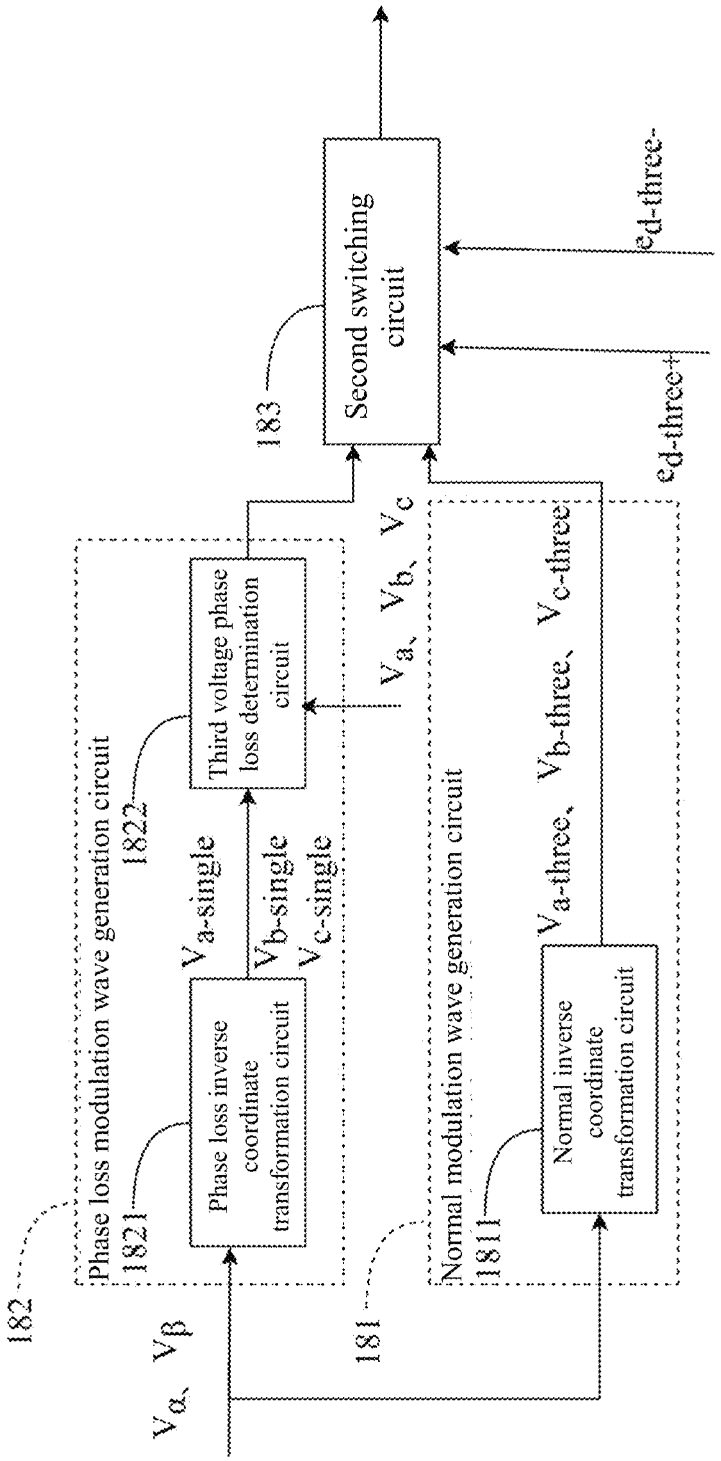
FIG. 7 is a block diagram of the modulation wave generation circuit of the present invention.

As shown in FIG. 7, when the phase loss determination circuit 14 determines that the system is in the phase loss operating state, the second switching circuit 183 receives the first coordinate rotational positive sequence voltage $e_{d\text{-}three+}$ and the first coordinate rotational negative sequence voltage $e_{d\text{-}three-}$ and switches to the phase loss operating state based on these voltages. In the phase loss operating state, the inverse coordinate transformation circuit under phase loss condition 1821 receives the first stationary coordinate system voltage $V_a$ and performs inverse coordinate transformation on this voltage, generating the first coordinate inverse transformation voltage $V_{a\text{-}single}$, the second coordinate inverse transformation voltage $V_{b\text{-}single}$, and the third coordinate inverse transformation voltage Ve-single. The third voltage phase loss determination circuit 1822 determines the phase sequence of the phase loss based on the line voltages $V_a$, $V_b$, $V_c$ of the three-phase power sources $e_a$, $e_b$, $e_c$. After determining the phase sequence of the phase loss, the third voltage phase loss determination circuit 1822 outputs a zero value for the line voltages $V_a$, $V_b$, $V_c$ corresponding to the phase-loss sequence, while the line voltages $V_a$, $V_b$, $V_c$ corresponding to the non-phase-loss sequences have phase angles that differ by 180 degrees. For example, if the second coordinate inverse transformation voltage $V_{b\text{-}single}$ is determined to correspond to the phase-loss sequence, the second coordinate inverse transformation voltage $V_{b\text{-}single}$ will output a zero value, while the first coordinate inverse transformation voltage $V_{a\text{-}single}$ will lead the third coordinate inverse transformation voltage $V_{c\text{-}single}$ by 180 degrees in the line voltage phase.

Referring to FIG. 2, in the phase loss operating state, the pulse width modulation circuit 19 outputs drive signals Sa, Sb, Sc based on the first coordinate inverse transformation voltage $V_{a\text{-}single}$, the second coordinate inverse transformation voltage $V_{b\text{-}single}$, and the third coordinate inverse transformation voltage $V_{c\text{-}single}$, and transmits the drive signals Sa, Sb, Sc to the three-phase converter 11 through the output terminal Output.

In the above embodiments, the coordinate transformation is the CLARK transformation (or α-β transformation) of the three-phase power sources $e_a$, $e_b$, $e_c$, which projects the three-phase power sources $e_a$, $e_b$, $e_c$ onto the α and β axes.

In the above embodiments, the rotational transformation is the PARK transformation (or d-q transformation) of the three-phase power sources $e_a$, $e_b$, $e_c$ based on the phase angle $\theta_{PLL}$, the three-phase phase angle $\theta_{PLL\text{-}three}$, or the single-phase phase angle $\theta_{PLL\text{-}single}$, projecting the three-phase power sources $e_a$, $e_b$, $e_c$ onto the d and q axes. The inverse rotational transformation is the inverse PARK transformation based on the phase angle $\theta_{PLL}$.

The above embodiments are applicable to most three-phase topologies, such as a three-phase six-arm bridge rectifier circuit, Vienna rectifier circuit, T-Type rectifier circuit, ANPC, etc.

Through the normalization of control between the normal operating state and the phase loss operating state in the d-q coordinate system, both modes can be treated as a single controlled object, allowing for the same design of the voltage and current loops for both modes and achieving identical dynamic performance.

Additionally, because the two modes are normalized in the d-q coordinate system, the design complexity and interruptions of resource usage in practical system applications are simplified, significantly streamlining the digital system design and reducing the difficulty of control.

Moreover, the design allows for a fast transition between the two modes, completing the transition in a short time (measured at 10 milliseconds), ensuring the stable operation of the three-phase converter 11.

Figure 8:
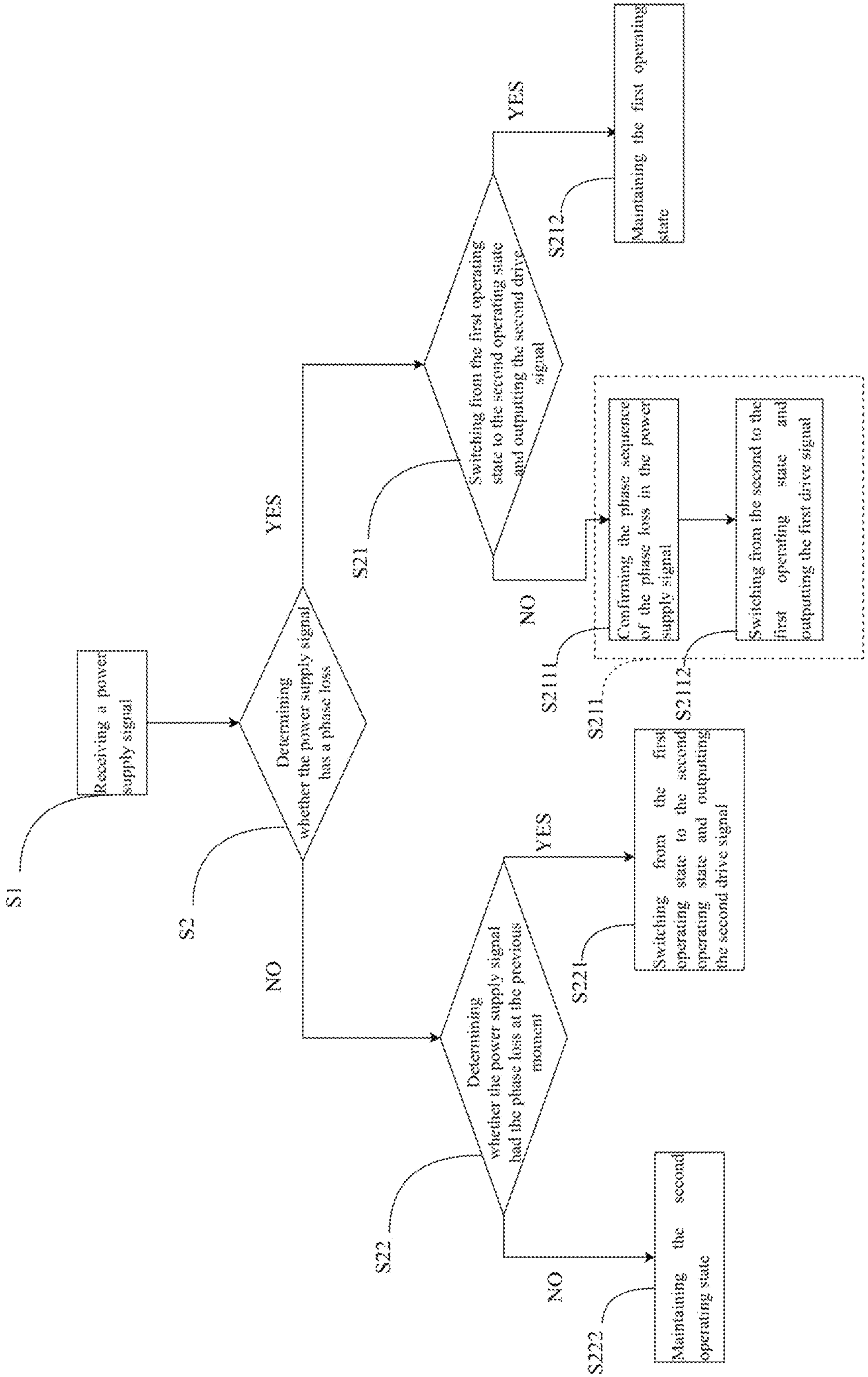
FIG. 8 is a flowchart of the control method for phase loss in a three-phase three-wire converter of the present invention.

Additionally, the present invention provides a control method for phase loss in a three-phase three-wire converter. As shown in FIG. 8, the method is executed by a processor and includes the following steps:

receiving a power supply signal (S1);

determining whether the power supply signal has a phase loss (S2);

if a phase loss is detected, determining whether the power supply signal had a phase loss at the previous moment (S21);

if no phase loss was detected at the previous moment, switching from the second operating state to the first operating state and outputting the first drive signal (S211);

if no phase loss is detected, determining whether the power supply signal had a phase loss at the previous moment (S22);

if a phase loss was detected at the previous moment, switching from the first operating state to the second operating state and outputting the second drive signal (S221).

In one embodiment, in the step of "if no phase loss was detected at the previous moment, switching from the second operating state to the first operating state and outputting the first drive signal (S211)," the method further includes the following sub-steps:

if no phase loss was detected at the previous moment, confirming the phase sequence of the phase loss in the power supply signal (S2111). Specifically, in this step, it is determined whether the power supply signal is missing the first phase sequence, second phase sequence, or third phase sequence; and after confirming the phase sequence of the phase loss, switching from the second operating state to the first operating state and outputting the first drive signal (S2112).

In one embodiment, after the step of "if a phase loss is detected, determining whether the power supply signal had a phase loss at the previous moment (S21)," the method further includes the following step:

if a phase loss was detected at the previous moment, maintaining the first operating state (S212). Specifically, if the current power supply signal is determined to have a phase loss and it is further determined that the power supply signal also had a phase loss at the previous moment, the system maintains the first operating state. In this embodiment, the first operating state is the phase loss operating state.

In one embodiment, after the step of "if no phase loss is detected, determining whether the power supply signal had a phase loss at the previous moment (S22)," the method further includes the following step:

if no phase loss was detected at the previous moment, maintaining the second operating state (S222). Specifically, if the current power supply signal is determined to have no phase loss and it is further determined that the power supply signal also had no phase loss at the previous moment, the system maintains the second operating state. In this embodiment, the second operating state is the normal operating state.

In summary, through the phase loss detection of the control method for phase loss in a three-phase three-wire converter and the three-phase AC control system, the system can instantly switch to the phase loss operating state when a phase loss occurs, thereby preventing the three-phase converter from shutting down. When no phase loss is detected, the system switches to the normal operating state. Furthermore, by sharing components between the phase loss operating state and the normal operating state, the complexity of state switching and system operation is significantly reduced, greatly enhancing the operational stability of the three-phase converter.

It should be noted that in this document, the terms "include" and "comprise," and any variations thereof, are intended to cover a non-exclusive inclusion, so that a process, method, article, or apparatus that comprises a list of elements not only includes those elements but may also include other elements not expressly listed or inherent to such process, method, article, or apparatus. Without further limitations, elements defined by the phrase "comprising a . . . " do not exclude the presence of additional identical elements in the process, method, article, or apparatus that comprises the element.

It should be noted that the embodiments given above are examples of the present invention rather than limitations of the present invention. Any variation without departing from the fundamental structure of the invention is to be encompassed within the scope of protection in accordance with the broadest interpretation of the appended claims.

What is claimed is:

1. A control method for phase loss in a three-phase three-wire converter, the control method for phase loss in the three-phase three-wire converter being executed by a processor and comprising the following steps:

receiving a power supply signal;

determining whether the power supply signal is experiencing a phase loss;

if a phase loss is detected, determining whether the power supply signal experienced a phase loss in a previous time instance;

if no phase loss was detected in the previous time instance, switching from a second operating state to a first operating state and outputting a first drive signal;

if no phase loss is detected, determining whether the power supply signal experienced a phase loss in the previous time instance;

if a phase loss was detected in the previous time instance, switching from the first operating state to the second operating state and outputting a second drive signal.

2. The control method for phase loss in the three-phase three-wire converter as claimed in claim 1, wherein, in the step of "if no phase loss was detected in the previous time instance, switching from the second operating state to the first operating state and outputting a first drive signal," the method further comprises the following sub-steps:

if no phase loss was detected in the previous time instance, confirming the phase sequence of the phase loss in the power supply signal; and after confirming the phase sequence of the phase loss in the power supply signal, switching from the second operating state to the first operating state and outputting the first drive signal.

3. The control method for phase loss in the three-phase three-wire converter as claimed in claim 1, wherein, after the step of "if the phase loss is detected, determining whether the power supply signal experienced the phase loss in the previous time instance," the method further comprises the following step:

if a phase loss was detected in the previous time instance, maintaining the first operating state.

4. The control method for phase loss in the three-phase three-wire converter as claimed in claim 1, wherein, after the step of "if no phase loss is detected, determining whether the power supply signal experienced the phase loss in the previous time instance," the method further comprises the following step:

if no phase loss was detected in the previous time instance, maintaining the second operating state.

5. A three-phase AC control system, comprising:

a three-phase converter, configured to receive a power supply signal; and a processor, having an input terminal and an output terminal, wherein the input terminal receives the power supply signal, and the output terminal is electrically connected to the three-phase converter, the processor being configured to determine whether the power supply signal is experiencing a phase loss; if a phase loss is detected, the processor determines whether the power supply signal experienced a phase loss at a previous time instance; if a phase loss is detected and no phase loss was detected at the previous time instance, the processor switches from a second operating state to a first operating state and outputs a first drive signal; if no phase loss is detected, the processor determines whether the power supply signal experienced a phase loss at the previous time instance; if no phase loss is detected and a phase loss was detected at the previous time instance, the processor switches from the first operating state to the second operating state and outputs a second drive signal.

6. The three-phase AC control system as claimed in claim 5, wherein the processor comprises:

a voltage coordinate transformation and phase-locked circuit, configured to receive the voltage of the power supply signal and, based on the voltage of the power supply signal, generate a first stationary coordinate system voltage, a second stationary coordinate system voltage, and a phase angle;

a phase loss determination circuit, configured to determine whether a phase loss has occurred based on the voltage of the power supply signal, to determine whether the system is in the first operating state or the second operating state, and to output a first coordinate rotational voltage potential, a second coordinate rotational voltage potential, and a phase angle;

a current coordinate transformation circuit, configured to output a first coordinate rotational current and a second coordinate rotational current in response to the first operating state or the second operating state;

a voltage loop circuit, configured to output a current control signal based on an error signal within a direct current voltage;

a current loop circuit, configured to receive the first coordinate rotational voltage potential, the second coordinate rotational voltage potential, and the phase angle from the phase loss determination circuit, to receive the first coordinate rotational current and the second coordinate rotational current from the current coordinate transformation circuit, and to receive the current control signal from the voltage loop circuit, thereby generating a first stationary coordinate system voltage and a second stationary coordinate system voltage;

a modulation wave generation circuit, configured to perform modulation wave processing on the first stationary coordinate system voltage under the first operating state to output the first drive signal, and to output the second drive signal based on the second operating state, the first stationary coordinate system voltage, and the second stationary coordinate system voltage.

7. The three-phase AC control system as claimed in claim 6, wherein the voltage coordinate transformation and phase-locked circuit comprises a normal voltage coordinate transformation and phase-locked circuit and a phase loss voltage coordinate transformation and phase-locked circuit; the current coordinate transformation circuit comprises a normal current coordinate transformation circuit, a phase loss current coordinate transformation circuit, a first switching circuit, and a current rotational transformation circuit; the modulation wave generation circuit comprises a normal modulation wave generation circuit and a phase loss modulation wave generation circuit.

8. The three-phase AC control system as claimed in claim 7, wherein the normal voltage coordinate transformation and phase-locked circuit comprises:

a voltage coordinate transformation circuit, configured to receive the voltage of the power supply signal, perform coordinate transformation on the voltage of the power supply signal, and generate a first axis coordinate transformed voltage, a second axis coordinate transformed voltage, and a three-phase phase angle;

a rotational transformation and positive/negative sequence component circuit, configured to perform rotational transformation on the first axis coordinate transformed voltage and the second axis coordinate transformed voltage based on the three-phase phase angle so as to generate the first stationary coordinate system voltage and the second stationary coordinate system voltage and to perform positive and negative sequence component processing on the first stationary coordinate system voltage and the second stationary coordinate system voltage, wherein the first coordinate rotational positive sequence voltage and the first coordinate rotational negative sequence voltage are generated based on the first stationary coordinate system voltage, and the second coordinate rotational positive sequence voltage and the second coordinate rotational negative sequence voltage are generated based on the second stationary coordinate system voltage;

a three-phase phase-locked circuit, configured to perform digital direct frequency synthesis and phase-locked processing on the first coordinate rotational positive sequence voltage, the first coordinate rotational negative sequence voltage, the second coordinate rotational positive sequence voltage, and the second coordinate rotational negative sequence voltage and to output the three-phase phase angle;

wherein the phase loss determination circuit is configured to determine whether the system is in a normal operating state based on the first coordinate rotational positive sequence voltage and the first coordinate rotational negative sequence voltage and to output the first coordinate rotational voltage potential, the second coordinate rotational voltage potential, and the phase angle.

9. The three-phase AC control system as claimed in claim 8, wherein the phase loss voltage coordinate transformation and phase-locked circuit comprises:

a first voltage phase loss determination circuit, configured to receive the voltage of the power supply signal and determine the phase sequence of the phase loss in the power supply signal based on the line voltage of the power supply signal;

a voltage second-order generalized integrator circuit, configured to filter the line voltage of the power supply signal corresponding to the phase sequence without phase loss and to generate a first axis coordinate transformed single-phase voltage and a second axis coordinate transformed single-phase voltage;

a voltage rotational transformation circuit, configured to perform rotational transformation on the first axis coordinate transformed single-phase voltage and the second axis coordinate transformed single-phase voltage based on the single-phase phase angle and to generate a first coordinate rotational single-phase voltage and a second coordinate rotational single-phase voltage;

a phase-locked circuit, configured to perform phase-locked processing on the first coordinate rotational single-phase voltage and the second coordinate rotational single-phase voltage and to output the single-phase phase angle;

wherein the phase loss determination circuit is configured to determine whether the system is in a phase loss operating state based on the first coordinate rotational positive sequence voltage and the first coordinate rotational negative sequence voltage and to output the first coordinate rotational voltage potential, the second coordinate rotational voltage potential, and the phase angle.

10. The three-phase AC control system as claimed in claim 9, wherein the normal current coordinate transformation circuit comprises:

a current coordinate transformation circuit, configured to receive the current of the power supply signal, perform coordinate transformation on the current of the power supply signal, and generate a first coordinate transformed current and a second coordinate transformed current.

11. The three-phase AC control system as claimed in claim 10, wherein the phase loss current coordinate transformation circuit comprises:

a second voltage phase loss determination circuit, configured to receive the line voltage of the power supply signal and determine the phase sequence of the phase loss in the power supply signal based on the line voltage of the power supply signal; and a current second-order generalized integrator circuit, configured to filter the current of the power supply signal corresponding to the phase sequence without phase loss and to generate a first coordinate transformed single-phase current and a second coordinate transformed single-phase current.

12. The three-phase AC control system as claimed in claim 11, wherein the first switching circuit and the second switching circuit are respectively configured to receive the first coordinate rotational positive sequence voltage and the first coordinate rotational negative sequence voltage and to switch to the phase loss operating state or the normal operating state; the current rotational transformation circuit is configured to perform rotational transformation on the first coordinate transformed current and the second coordinate transformed current based on the phase angle and to generate the first coordinate rotational current and the second coordinate rotational current, or to perform rotational transformation on the first coordinate transformed single-phase current and the second coordinate transformed single-phase current based on the phase angle and to generate the first coordinate rotational current and the second coordinate rotational current.

13. The three-phase AC control system as claimed in claim 12, wherein the normal modulation wave generation circuit comprises:

a normal inverse coordinate transformation circuit, configured to receive the first stationary coordinate system voltage and the second stationary coordinate system voltage and to perform inverse coordinate transformation on the first stationary coordinate system voltage and the second stationary coordinate system voltage so as to generate a first coordinate inverse transformation voltage, a second coordinate inverse transformation voltage, and a third coordinate inverse transformation voltage.

14. The three-phase AC control system as claimed in claim 13, the phase loss modulation wave generation circuit comprising:

an inverse coordinate transformation circuit under phase loss conditions, configured to receive the first stationary coordinate system voltage and to perform inverse coordinate transformation on the first stationary coordinate system voltage so as to generate a first coordinate inverse transformation phase loss voltage, a second coordinate inverse transformation phase loss voltage, and a third coordinate inverse transformation phase loss voltage;

a third voltage phase loss determination circuit, configured to determine the phase sequence of the phase loss based on the line voltage of the power supply signal and to output a zero value for the first coordinate inverse transformation phase loss voltage, the second coordinate inverse transformation phase loss voltage, or the third coordinate inverse transformation phase loss voltage corresponding to the phase sequence with phase loss when the phase angle difference between two of the first coordinate inverse transformation phase loss voltage, the second coordinate inverse transformation phase loss voltage, or the third coordinate inverse transformation phase loss voltage corresponding phase sequences without phase loss is 180 degrees.

15. The three-phase AC control system as claimed in claim 14, wherein the voltage loop circuit is configured to receive an actual DC voltage and a desired DC voltage, to calculate an error signal between the actual DC voltage and the desired DC voltage, and to input the error signal to a proportional-integral circuit to generate the current control signal and transmit the current control signal to the current loop circuit.

16. The three-phase AC control system as claimed in claim 15, wherein the current loop circuit receives the current control signal, calculates a first error signal between the current control signal and the first coordinate rotational current, and calculates a second error signal between the second coordinate rotational current and a constant value; the first error signal and the second error signal are transmitted to the proportional-integral circuit to generate a first error voltage and a second error voltage respectively, and upon receiving the first coordinate rotational current and the second coordinate rotational current, the current loop circuit transmits the first coordinate rotational current and the second coordinate rotational current to a decoupling circuit to perform decoupling processing so as to generate a first decoupling voltage on the first axis and a second decoupling voltage on the second axis; based on the second decoupling voltage, the first coordinate rotational voltage potential, and the first error voltage, the current loop circuit calculates a first rotational error voltage, and based on the phase angle, adds the first rotational error voltage to the actual DC voltage in inverse rotational transformation to generate the first stationary coordinate system voltage; based on the first decoupling voltage, the second coordinate rotational voltage potential, and the second error voltage, the current loop circuit calculates a second rotational error voltage, and based on the phase angle, adds the second rotational error voltage to the actual DC voltage in inverse rotational transformation to generate the second stationary coordinate system voltage.

* * * * *